US012169022B2

(12) United States Patent
Baumann et al.

(10) Patent No.: US 12,169,022 B2
(45) Date of Patent: Dec. 17, 2024

(54) PISTON COMPRESSOR

(71) Applicant: Borsig ZM Compression GmbH, Berlin (DE)

(72) Inventors: Heinz Baumann, Winterthur (CH); Andi Ziermann, Zwickau (DE)

(73) Assignee: BORSIG ZM COMPRESSION GMBH, Berlin (DE)

(*) Notice: Subject to any disclaimer, the term of this patent is extended or adjusted under 35 U.S.C. 154(b) by 89 days.

(21) Appl. No.: 18/184,753

(22) Filed: Mar. 16, 2023

(65) Prior Publication Data

US 2023/0332687 A1 Oct. 19, 2023

(30) Foreign Application Priority Data

Apr. 14, 2022 (DE) ...................... 10 2022 001 448.3

(51) Int. Cl.
F16J 15/18 (2006.01)
F04B 39/00 (2006.01)
F04B 53/16 (2006.01)

(52) U.S. Cl.
CPC ........... F16J 15/18 (2013.01); F04B 39/0022 (2013.01); F04B 53/164 (2013.01)

(58) Field of Classification Search
None
See application file for complete search history.

(56) References Cited

U.S. PATENT DOCUMENTS

| 2009/0121440 A1* | 5/2009 | Feistel | F16J 15/445 |
| | | | 277/308 |
| 2014/0070127 A1* | 3/2014 | Blume | F16K 15/063 |
| | | | 251/359 |

FOREIGN PATENT DOCUMENTS

| DE | 102004052168 A1 | 5/2006 |
| DE | 102004011410 B4 | 11/2007 |
| DE | 102013002864 A1 | 8/2014 |
| EP | 2594795 A1 | 5/2013 |
| WO | 9831936 A1 | 7/1998 |

* cited by examiner

Primary Examiner — Kenneth J Hansen
(74) Attorney, Agent, or Firm — McGlew and Tuttle, P.C.

(57) ABSTRACT

A piston compressor includes a crankcase (11), a crankshaft (12), connecting rods (13), a crosshead (14) with an arranged piston rod (15) and a piston (16), dry-running guided in a cylinder (17). Valves (18) are provided. A piston rod sealing device (19), around the piston rod between the cylinder (17) and the crankcase, includes a gland device (22), arranged in a gland housing (21), inserted into a piston compressor housing (20). The gland device includes a gland jacket (24) pushed into a gland (23) limiting, with the piston rod, a sealing gap (25), which is open over a common longitudinal section, has a width in the μm range and allows a leakage flow (26) of the compressed medium therethrough. The gland and the gland jacket are formed of different materials with a resulting coefficient of thermal expansion essentially the same as the material of the piston rod.

20 Claims, 7 Drawing Sheets

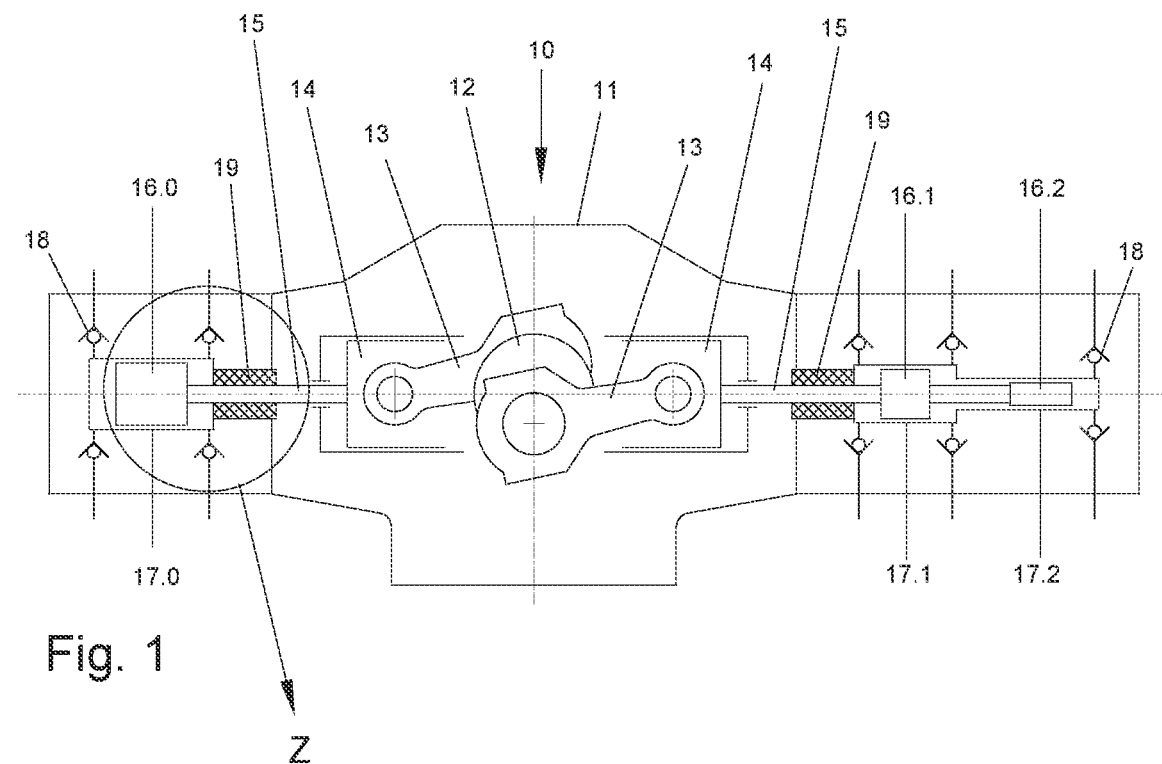
Fig. 1
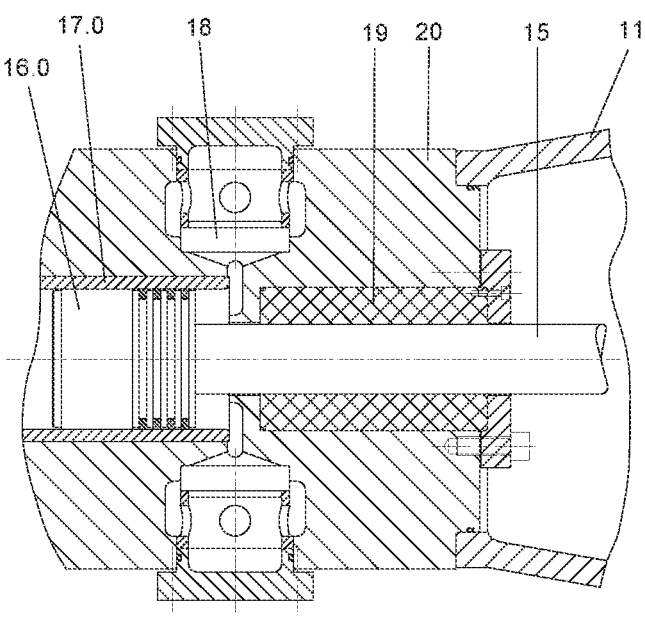

PISTON COMPRESSOR

CROSS REFERENCE TO RELATED APPLICATIONS

This application claims the benefit of priority under 35 U.S.C. § 119 of German Application 10 2022 001 448.3, filed Apr. 14, 2022, the entire contents of which are incorporated herein by reference.

TECHNICAL FIELD

The present invention pertains to a piston compressor comprising a crankcase, a crankshaft arranged therein, connecting rods, a crosshead with a piston rod arranged thereon, to which piston rod at least one piston is fastened, which piston is guided in a cylinder in a dry-running manner, as well as valves and at least one piston rod sealing device, which is arranged around the piston rod between the cylinder and the crankcase.

BACKGROUND

Oil-free or dry-running high-pressure piston compressors are used to compress gases. The piston compressors are usually configured as multistage and double-acting compressors, so that both the lower side and the upper side of the pistons are used for the compression.

A linear compressor is known from DE 10 2004 052 168 A1. Piston compressors are especially used for compressing gases. The principal components of the compressor in double-acting compressors are a crankcase, a crankshaft arranged therein, at least one cylinder, connecting rods, a crosshead with piston rod, to which at least one piston is fastened, main bearings and connecting rod bearings as well as sealing elements and valves. Especially piston rings and guide rings as well as a piston rod seal are subject to an undesirably high temperature due to friction in such dry-running compressors due to high piston speed, which considerably reduces the useful life of the sealing rings.

A piston compressor, which has a piston rod seal for sealing an oscillating piston rod, is known from DE 10 2004 011 410 B4, wherein a plurality of sealing elements, which are mounted on the outer circumference of the piston rod and are arranged in a sealing manner on the running surface in the sealing housing or on the running surface of a bushing arranged in the sealing housing, are arranged between the piston rod and a running surface in the sealing housing, wherein the running surface may be surface-treated to increase the wear resistance.

Further, a device for compressing a gaseous fluid or a fluid consisting of gaseous and liquid components, in which the fluid is drawn in by a compressor and is compressed there in a compression space, is known from EP 2 594 795 A1, wherein liquid is introduced into the compression space during the compression.

Furthermore, a liquid-cooled, double-walled, one-stage or multistage piston compressor with at least one piston for compressing a medium, which is connected to a linearly oscillating drive via a piston rod, is known from DE 10 2013 002 864 A1. The piston is arranged axially movably in a cylinder, which is provided with cylinder covers on the piston side and on the crank side. The means for the liquid cooling comprises a cylinder having a double-walled shape, on the side of which, which side faces the piston, one or more cooling openings are provided, via which the coolant flowing through the double-walled cylinder comes into contact with the area of the cylinder.

A crankcase is usually pressure-proof to a limited extent only. Double-acting cylinders shall therefore be sealed extensively against the crankcase by piston rod glands or glands (stuffing boxes).

The conventional glands in oil-free compressors are made of sealing rings, which are manufactured from polymers. The sealing rings are in contact with the piston rod and are pressed against the piston rod by pressure, which is generated during compression. Such forces of pressure against the reciprocatingly moving piston rod generate high frictional energy and extensive wear on sealing elements and on the piston rod.

In case of a required mode of operation of a compressor for the high pressures to be generated, the wear on the gland elements is sought to be kept as low as possible by means of highly complicated gland systems with special cooling.

WO 9831936 A1 discloses a compressor, which comprises at least one cylinder and a piston guided in the cylinder in a dry-running manner, which piston limits with a cylinder insert a respective annular gap, which is open over the common longitudinal section, and which allows a leakage flow of the compressed medium. The piston is coupled via a piston rod with a supporting part, which is guided displaceably in the direction of the longitudinal axis and which is connected to a driving device. The piston rod cooperates with the piston and with the supporting part via support surfaces which are convex on the end face and which allow relative movements of the supporting parts running at right angles to the longitudinal axis in relation to the piston.

It proved to be especially disadvantageous in dry-running compressors when especially piston rings and guide rings as well as a piston rod gland are subject to friction due to an undesirably high temperature. The useful life of sealing rings is considerably reduced based on the stress due to friction with high temperatures developing in an undesired manner.

SUMMARY

An object of the preset invention is to provide a further improved piston compressor for high pressures, which is suitable for embodiments with selectable dimensions within a relatively wide range and can be manufactured in a simple and cost-effective manner, which makes it possible in a structurally simple manner in case of relatively long-stroke embodiments to form a dry-running annular gap seal for a piston rod gland, which ensures a constant leakage flow.

The basic object is accomplished according to the present invention by features according to the invention.

It was found to be especially advantageous that the piston rod sealing device for the piston rod gland is configured as a gland device, which is arranged in a gland housing, which is accommodated in a piston compressor housing. The gland device comprises a gland and a gland jacket, into which the gland is pushed.

The gland advantageously forms with the piston rod a respective sealing gap, which is open over the common longitudinal section and has a width of a few μm, and which allows a leakage flow of the compressed medium through the gap.

The gland and the gland jacket each consist of different materials, whose common resulting coefficient of thermal expansion advantageously has essentially the coefficient of thermal expansion of the material of the piston rod. In particular, the resulting coefficient of thermal expansion based on the coefficient of thermal expansion of the gland and the coefficient of thermal expansion of the gland jacket is selected such that the resulting coefficient of thermal expansion is matched to the coefficient of thermal expansion of a material of the piston rod to eliminate or minimize any difference between the resulting coefficient of thermal expansion and the coefficient of thermal expansion of a material of the piston rod.

The gland device is advantageously connected flush and in a tightly sealing manner with a movable intermediate ring. The intermediate ring is advantageously arranged in a recess of the gland housing between the gland device and a tilting pin housing arranged in the recess of the gland housing.

The gland device is advantageously in connection via the intermediate ring and the tilting pin housing with a ring, which is arranged in a recess of a gland flange, which is rigidly connected to the gland housing and to the piston compressor housing.

The gland device is advantageously supported with the gland on the gland flange via the intermediate ring without lateral forces with a plurality of spherical elements, which are arranged about a vertical axis of the piston rod between the movable intermediate ring and the fixed ring.

Further, a tilting ring, which makes it advantageously possible for the gland device to adjust an oblique position of the piston rod without an appreciable force action of the piston rod on the gland device, is arranged in a recess of the intermediate ring.

The gland device is supported without lateral forces on the gland flange in an advantageous manner with a plurality of tilting pins, which are arranged in a planetary manner (in a planetary configuration) about a vertical axis of the piston rod between the movable intermediate ring and the fixed ring.

The tilting pins advantageously have a length of a predefined sphere diameter and are configured with embossed ends with a radius equaling half the length of a tilting pin.

The tilting pins are, furthermore, jacketed elastically with a suitable elastomer, such as a short piece of a flexible hose, and are positioned elastically in the area facing away from the applied pressure.

The gland device is advantageously connected flush and in a tightly sealing manner to the intermediate ring via a sealing ring arranged in a groove in an end face of the tilting pin housing.

The intermediate ring is advantageously hardened and polished and can be moved laterally with the gland device without lateral forces.

The intermediate ring can, furthermore, advantageously transmit an axial force applied to the gland device to the tilting pins, which are arranged as spherical elements movably between the intermediate ring and the hardened ring.

The tilting ring preferably has on its end faces a very large radius of curvature and the radius of curvature has a barrel-shaped vault, and the axes of the barrel-shaped vaults are offset by 90° in relation to one another on both end faces of the tilting ring.

Further, it proved to be advantageous that the tilting ring allows the gland device to adjust an oblique position of the piston rod, caused by a lateral movement of the piston rod, without appreciable force action between the gland device and the piston rod.

Furthermore, it proved to be especially advantageous that the tilting ring allows slight pitching movements of the gland device in all directions.

Further advantages and details of the present invention are explained in more detail in the description on the basis of exemplary embodiments shown schematically in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 1 is a schematic view of a piston compressor in a sectional view on a reduced scale according to the present invention and a detail Z on an enlarged scale;

DESCRIPTION OF PREFERRED EMBODIMENTS

Figure 2:
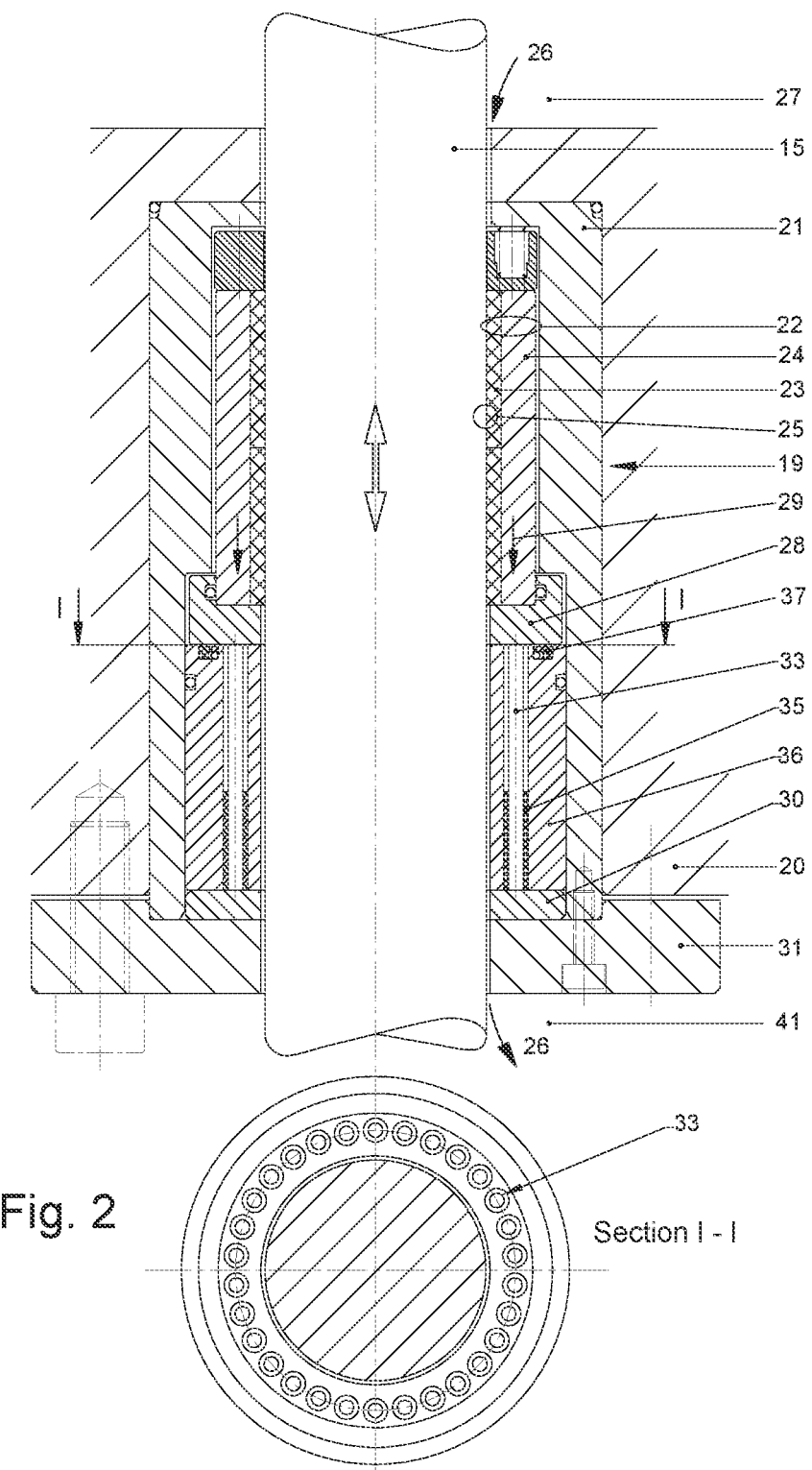
FIG. 2 is a sectional view showing an exemplary embodiment according to detail Z of a piston rod sealing device with split ring seal of a piston compressor according to FIG. 1 according to the present invention and a top view of the section I-I.

Referring to the drawings, FIG. 1 schematically shows a piston compressor 10, which comprises a crankcase 11 with a crankshaft 12 as well as connecting rods 13 and at least one crosshead 14 with a respective piston rod 15, which is arranged at the crosshead 14, and to which respective pistons 16.0, 16.1 and 16.2 are fastened. The pistons 16.0, 16.1 are arranged in double-acting cylinders 17.0, 17.1 and the piston 16.2 is arranged in a single-acting cylinder 17.2 in an axially movable manner. Furthermore, valves 18 are arranged for suctioning or discharging gases and a respective piston rod sealing device 19 each is arranged in the double-acting cylinders 17.0 and 17.1 for sealing the piston rod 15 against the crankcase 11.

Detail Z shows on an enlarged scale by broken lines the crankcase 11, the arranged piston rod 15 and the piston 16.0 fastened to the piston rod. The piston 16.0 is guided movably in the cylinder 17.0. Furthermore, the valves 18 and the piston rod sealing device 19, which are arranged in a piston compressor housing 20 around the piston rod 15, are shown.

FIG. 2 shows an exemplary embodiment of the piston rod sealing device 19 with split ring seal in a sectional view of a piston compressor 10 according to detail Z according to FIG. 1. The piston rod 15 is arranged in the suggested piston compressor housing 20, in which a gland housing 21 for the piston rod sealing device 19 is arranged. The piston rod sealing device 19 comprises a gland device 22, which is composed of a gland jacket 24 and of a gland 23 inserted into same. The gland 23 of the gland device 22 touches the surface of the piston rod 15 with a clearance of a few µm over a suggested sealing gap 25, which is formed between the surface of the piston rod 15 and the gland 23.

A split ring seal is a flow seal. A slight leakage flow 26 through a gap is suggested by an arrow. About 3% of the flow rate of a compressor equals the value of the leakage flow through a gap, which is formed in the sealing gap 25, which is formed between the reciprocatingly moving piston rod 15 and the gland 23. The leakage flow 26 through a gap seals a split ring seal against high pressure differences, which prevail between a cylinder pressure 27 and a pressure 41 in the crankcase 11, and the pressure of the leakage flow 26 through a gap decreases continuously over the entire length of the sealing gap 25.

The gland 23 of the gland device 22 usually has a manufacturing clearance of about 15 µm against the piston rod 15. The gland 23 preferably consists of a CF-PEEK material (carbon fiber-polyether ether ketone) and lies with a clearance on the surface of the piston rod 15. The gland 23 is pressed into the gland jacket 24, which is manufactured from a steel. The gland 23 as well as the gland jacket 24 are manufactured from materials that allow the gland on the surface positioned opposite the piston rod 15 to have approximately the same thermal expansion as the surface of the piston rod 15. The pressing between the gland 23 consisting of carbon fiber-PEEK material and the gland jacket 24 is temperature-dependent and can be maintained at an essentially constant value within predefined temperature ranges of allowable operating states.

A split ring seal operates practically in a frictionless manner and is consequently especially suitable for oil-free or dry-running piston compressors for sealing high pressure differences of usually 150 bar and higher.

As is suggested by an arrow, the gland device 22 is acted on with an axial force 29, which arises from a pressure difference that is formed from a prevailing cylinder pressure 27 in the cylinder 17 and from an existing pressure 41 present in the crankcase 11. Based on the pressure reduction in the sealing gap, the pressures prevailing in the interior space of the sealing gap 25 are not so high. The gland device 22 is compressed by the pressure difference, and the sealing gap 25 decreases with increasing cylinder pressure 27. The sealing gap 25 and the gland 23 communicate or interact with one another, and the sealing gap always has a width of about one (1) µm between the surface of the piston rod 15 and the opposite surface of the gland.

The reciprocatingly moving piston rod 15 also moves with ease at right angles to the imaginary cylinder axis. The gland device 22, which lies with the gland 23 on the piston rod 15 with a clearance of about two (2) µm, must be able to reproduce such slight lateral movements, doing so without a major or appreciable force action of the piston rod 15 on the gland 23.

The gland device 22 is connected to an intermediate ring 28. The intermediate ring 28 is arranged movably in a recess of the gland housing 21. A tilting pin housing 36 is likewise inserted behind the intermediate ring 28 in the recess of the gland housing 21. The intermediate ring 28 is arranged flush and in a tightly sealing manner with the gland device 22. The gland device 22 is acted on with the axial force 29 and it allows a pressure to be applied to a ring 30, which is arranged in a recess of a gland flange 31, via the intermediate ring 28 and the tilting pin housing 36. The gland flange 31 is rigidly connected to the gland housing 21 and to the piston compressor housing 20.

If the intermediate ring 28 and the ring 30 were lying directly on one another, a static friction would have to be overcome for a lateral displacement of the gland device 22.

Figure 5:
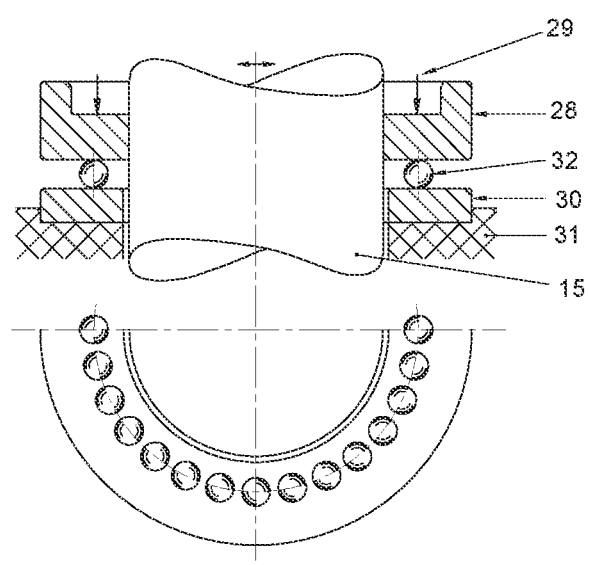
FIG. 5 is a schematic view of a support of an intermediate ring with spheres in a sectional view according to an exemplary embodiment of a piston rod sealing device according to FIG. 2 according to the present invention.

A static friction for a lateral displacement of the gland device 22 is avoided by arranging a plurality of so-called spherical elements 32 or tilting pins 33 in the tilting pin housing 36. The spherical elements 32 or tilting pins 33 are arranged, as is shown in FIG. 2 and FIG. 5 and shown in a sectional view I-I or half section in a top view, around a vertical axis of the piston rod 15 between the movable intermediate ring 28 and the fixed ring 30 in a planetary manner. The tilting pins 33 are jacketed with a flexible elastomer 35 in the lower part on the side located opposite the ring 30.

Figure 3:
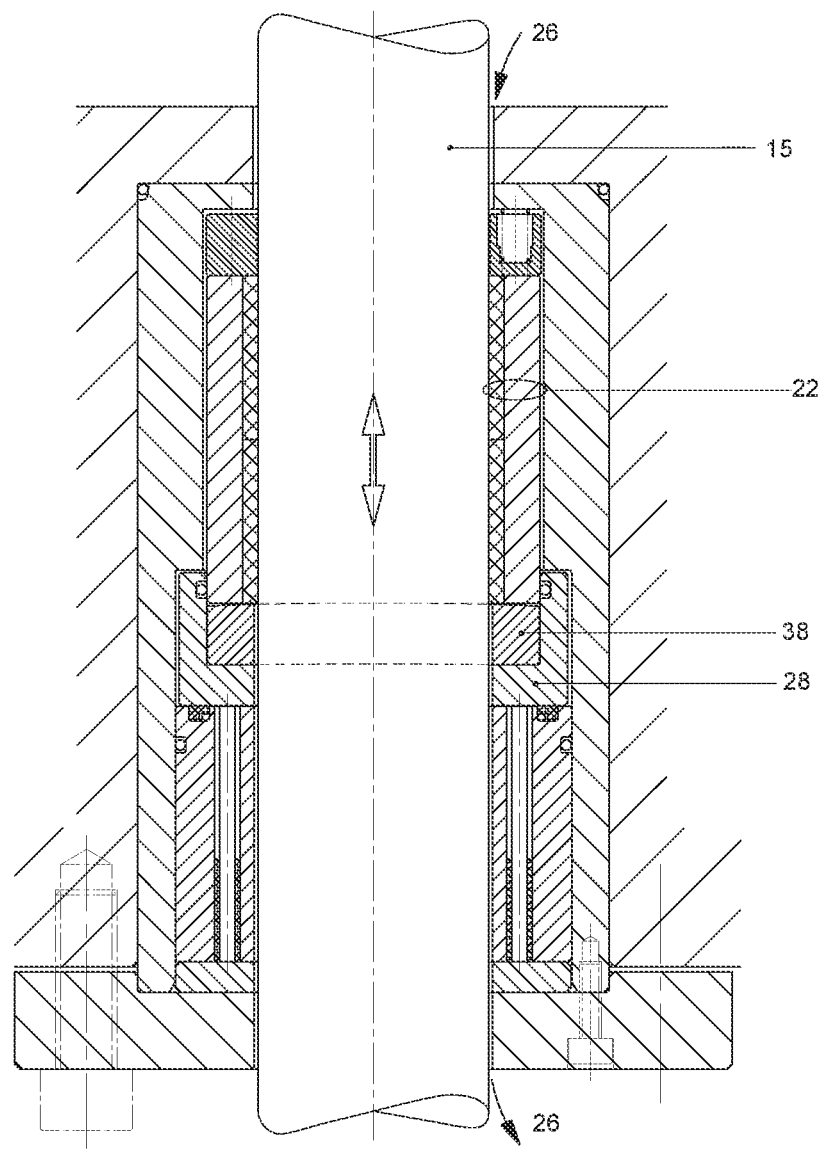
FIG. 3 is a sectional view according to FIG. 2 showing an exemplary embodiment of a piston rod sealing device with split ring seal and with a tilting ring according to the present invention.

As is shown in FIG. 3, a tilting ring 38 is arranged in a recess of the intermediate ring between the gland device 22 and the intermediate ring 28. The tilting ring 38 allows the gland device 22 to adjust an oblique position of the piston rod 15 by a lateral movement of the piston rod without appreciable force action between the gland device and the piston rod.

The tilting ring 38 is comparable to a universal joint. The tilting ring 38 can transmit only forces of pressure in the axial direction. The tilting ring 38 allows slight pitching movements of the gland device 22 in all directions.

Figure 4:
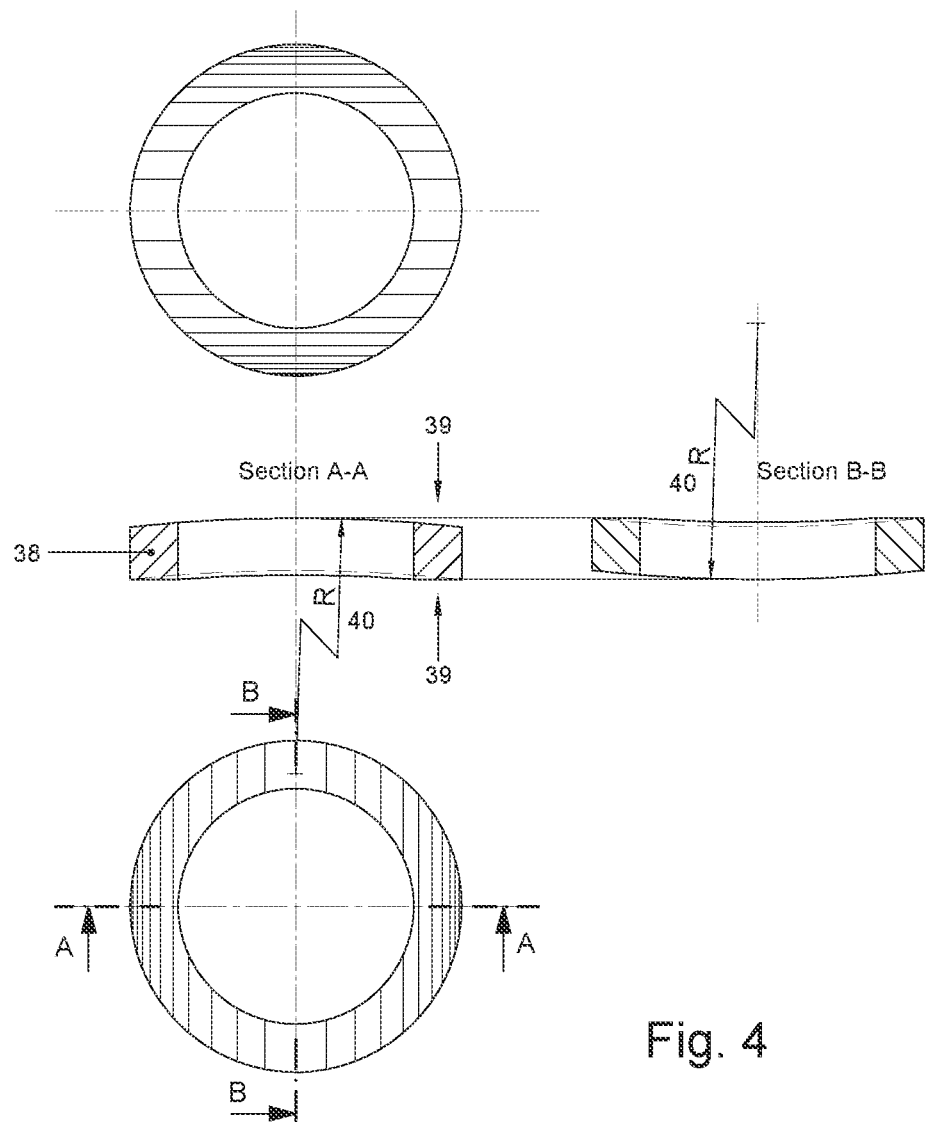
FIG. 4 is a sectional view and top and bottom views of a tilting ring and in side sectional views A-A and B-B each rotated by 90° according to an exemplary embodiment of a piston rod sealing device according to FIG. 3 according to the present invention.

FIG. 4 shows a schematic image of a tilting ring 38 in a top view and in a side view in sectional views A-A and B-B each rotated by 90°. End faces 39 of the tilting ring 38 are vaulted with a very large radius of curvature in a barrel-shaped manner. The axes of the barrel vaults on both end faces of the tilting ring 38 are offset by 90° in relation to one another.

The spherical elements (spherically acting tilting elements) 32 are spheres in the simplest case, as is shown in FIG. 5. The spheres are arranged between the intermediate ring 28 and the ring 30 arranged in the gland flange 31 and are positioned around the piston rod 15, as is seen in the half section.

The axial force 29 applied via the intermediate ring 28 to the spherical elements 32 is distributed in the optimal case uniformly among the number of spherical elements. The Hertzian pressure on the spherical elements 32 and pre-defined contact surfaces may be very high in case of high pressure differences.

The Hertzian contact stress $p_0$ is a geometric function of the radius of the sphere according to the following relationship:

$$p_0 \sim r^{-\frac{2}{3}}$$

Example: If the sphere radius r is increased by the factor 10, the Hertzian contact stress $p_0$ decreases by the factor of 4.6.

Figure 6:
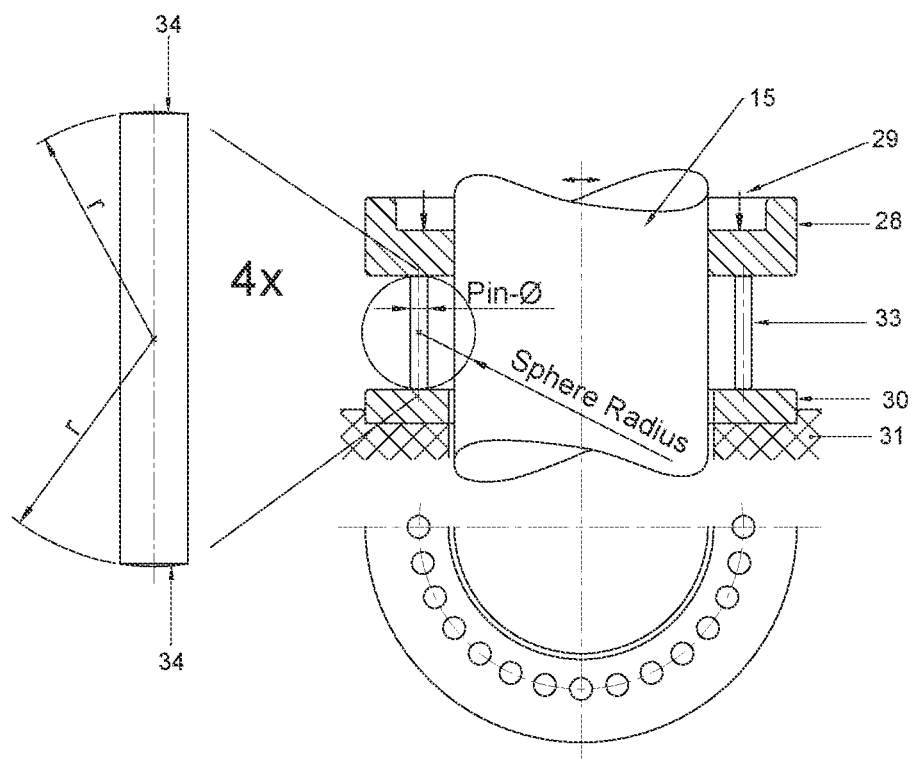
FIG. 6 is a schematic view of a support of an intermediate ring with pins in a sectional view according to an exemplary embodiment of a piston rod sealing device according to FIG. 2 according to the present invention.

Spherical elements 32 are shown analogously by way of suggestion in FIG. 6 during use with a large sphere diameter. A large sphere is reduced quasi to a so-called tilting pin 33 as the spherically acting tilting elements. The tilting pins (spherically acting tilting elements) 33 each have a length of a predefined sphere diameter and have embossed ends 34 with a radius corresponding to half of the length of a tilting pin. The tilting pins 33 are arranged between the intermediate ring 28 and the ring 30 fastened in the gland flange 31 and are positioned around the piston rod 15 in a planetary manner, as is seen in the half section. The axial force 29 applied to the tilting pins 33 via the intermediate ring 28 is distributed in the optimal case uniformly among the number of tilting pins.

Figure 7:
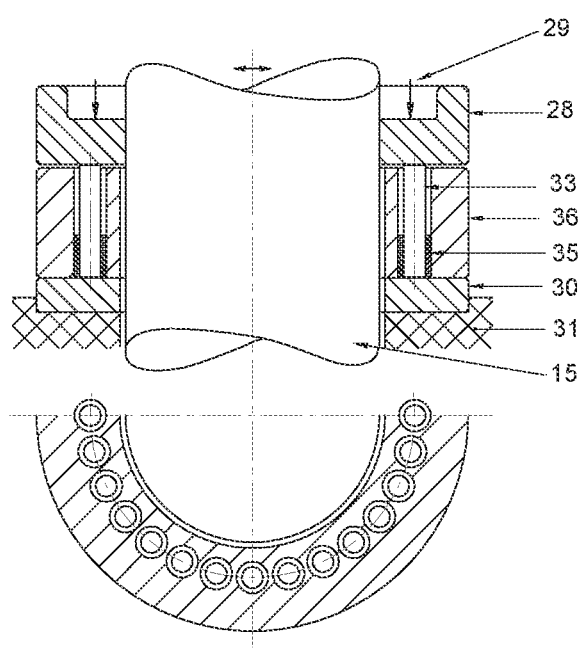
FIG. 7 is a sectional view of a support of an intermediate ring with pins in an elastic mount according to an exemplary embodiment of a piston rod sealing device according to FIG. 2 according to the present invention.

The tilting pins 33 are positioned elastically by a suitable elastomer 35, e.g., by a short piece of a flexible hose according to FIG. 2 and FIG. 7 in the area facing away from the pressure.

The intermediate ring 28 may be hardened and polished and can move laterally with the gland device 22 without lateral forces. The axial force 29 applied via the intermediate ring 28 is distributed uniformly over the tilting pins 33 arranged in the tilting pin housing 36, which tilting pins 33 are arranged movably like spheres between the intermediate ring 28 and the hardened ring 30. The tilting pins 33 are arranged between the intermediate ring 28 and the ring 30 fastened in the gland flange 31 and are positioned around the piston rod 15 in a planetary manner, as is seen in the half section.

The tilting pins 33 have a length that is longer by a few μm than the tilting pin housing 36 in the loaded state of the tilting pins. A sealing ring 37 consisting of a PTFE material is arranged between the intermediate ring 28 and the tilting pin housing 36. The sealing ring 37 bridges over an axial gap, not shown, between the intermediate ring 28 and the tilting pin 36 and seals this gap and thus prevents an additional leakage flow through the gap.

A slight oblique position of the piston rod 15 may occur in connection with a lateral movement of the piston rod. The gland device 22 allows the oblique position to be reproduced without a major or appreciable force action between the gland device and the piston rod 15.

A compressor with a gland device based on a split ring seal has especially the following advantages. In dry-running compressors, especially piston and guide rings as well as a piston ring seal are subject due to friction to an undesirably high temperature. The service life of sealing rings is considerably reduced as a result. In double-acting single-stage or multistage piston compressors, sealing of a piston rod is brought about by high pressures caused in cylinders at high piston speeds by the fact that a quasi contactless flow seal is formed with a split ring seal as a piston rod sealing device 19.

The piston ring sealing device 19 comprises a gland device 22, which is formed especially in a gland housing 21 and comprises a gland 23 and a gland jacket 24 as well as an intermediate ring 28, a tilting ring 38 and tilting pins 33. The special configuration of the piston rod sealing device 19 with a shrink connection of the gland device 22 consisting of a CF-PEEK material for the gland 23 and of a steel for the gland jacket 24 makes it possible to reproduce a coefficient of thermal expansion of the piston rod 15. The gland device 22 can be supported without lateral forces by means of tilting pins 33 arranged around the axis of the piston rod 15 in a planetary manner. The arranged tilting ring 38 makes it possible for the gland device 22 to adjust a slight oblique position of the piston rod 15 without appreciable force action (with a reduced force action).

A special cooling for the cylinder and piston rod seal is eliminated based on the special configuration of the piston rod sealing device 19 in double-acting, single-stage or multistage piston compressors.

While specific embodiments of the invention have been shown and described in detail to illustrate the application of the principles of the invention, it will be understood that the invention may be embodied otherwise without departing from such principles.

LIST OF REFERENCE NUMBERS

10 Piston compressor device
11 Crankcase
12 Crankshaft
13 Connecting rod
14 Crosshead
15 Piston rod
16 Piston device
17 Cylinder
18 Valve
19 Piston rod sealing device
20 Piston compressor housing
21 Gland housing
22 Gland device
23 Gland
24 Gland jacket
25 Sealing gap
26 Leakage flow through a gap
27 Cylinder pressure
28 Intermediate ring
29 Axial force
30 Ring
31 Gland flange
32 Spherical element (spherically acting tilting elements)
33 Tilting pin (spherically acting tilting elements)
34 Embossed ends of the tilting pin
35 Elastomer
36 Tilting pin housing
37 Sealing ring
38 Tilting ring
39 End face of the tilting ring
40 Radius of curvature
41 Pressure in the crankcase

What is claimed is:
1. A piston compressor comprising:
a crankcase;
a crankshaft arranged in the crankcase;
connecting rods;
a cross head with arranged piston rod;
a piston compressor housing;
a cylinder;
a piston fastened to the piston rod, the piston being dry-running guided in the cylinder;
valves;
a piston rod sealing device arranged around the piston rod between the cylinder and the crankcase, the piston rod sealing device comprising:
a gland housing, which is inserted into the piston compressor housing; and
a gland device arranged in the gland housing, the gland device comprising: a gland; and a gland jacket into which the gland is pushed;
a movable intermediate ring;
a tilting elements housing arranged in a recess of the gland housing;
a gland flange rigidly connected to the gland housing and to the piston compressor housing;
a fixed ring arranged in a recess of the gland flange;

a plurality of spherically acting tilting elements, which are arranged around a vertical axis of the piston rod between the movable intermediate ring and the fixed ring; and a tilting ring arranged in a recess of the intermediate ring, wherein the gland defines with the piston rod a sealing gap, which is open over a common longitudinal section and has a width in a μm range, and which is configured to allow a leakage flow of compressed medium through the sealing gap, wherein the gland and the gland jacket are each comprised of different materials providing a resulting coefficient of thermal expansion that is essentially the coefficient of thermal expansion of a material of the piston rod, wherein the gland device is connected flush and tightly sealed to the movable intermediate ring, which movable intermediate ring is arranged in a recess of the gland housing between the gland device and the tilting pin housing that is arranged in the recess of the gland housing, wherein the gland device is in connection via the intermediate ring and the tilting pin housing with the fixed ring that is arranged in a recess of the gland flange, wherein the gland device is supported without lateral forces on the gland flange with the plurality of spherical elements, wherein the gland device allows an adjustment of an oblique position of the piston rod essentially without force action of the piston rod on the gland device via the tilting ring.

2. A piston compressor in accordance with claim 1, wherein the plurality of spherically acting tilting elements comprise a plurality of tilting pins arranged around a vertical axis of the piston rod between the movable intermediate ring and the fixed ring in a planetary configuration, wherein the gland device is supported without lateral forces on the gland flange with the plurality of tilting pins.

3. A piston compressor in accordance with claim 2, wherein the tilting pins have a length of a predefined sphere diameter and have embossed ends with a radius corresponding to half the length of a tilting pin.

4. A piston compressor in accordance with claim 2, wherein the tilting pins are jacketed with an elastomer and elastically positioned in an area facing away from an applied force.

5. A piston compressor in accordance with claim 1, further comprising a sealing ring, wherein the gland device is connected to the intermediate ring flush and sealed tightly via the sealing ring, which sealing ring is arranged in a groove in an end face of the tilting pin housing.

6. A piston compressor in accordance with claim 5, wherein the intermediate ring is hardened and polished and is configured to be moved laterally with the gland device without a lateral force.

7. A piston compressor in accordance with claim 6, wherein the intermediate ring is configured to allow an axial force, applied to the gland device, to be transmitted to the tilting pins, which tilting pins are arranged movably with a spherical movement action of the plurality of spherically acting tilting elements between the intermediate ring and the fixed ring.

8. A piston compressor in accordance with claim 1, wherein the tilting ring has tilting ring end faces with a radius of curvature, which has barrel vaults which are each vaulted in a barrel shape, wherein the axes of the barrel vaults are offset in relation to one another on both end faces of the tilting ring by 90°.

9. A piston compressor in accordance with claim 7, wherein the tilting ring is configured to allow the gland device to adjust an oblique position of the piston rod by a lateral motion of the piston rod without an appreciable force action between the gland device and the piston rod.

10. A piston compressor in accordance with claim 7, wherein the tilting ring allows an amount of pitching movements of the gland device in all directions.

11. A piston compressor comprising:
a crankcase;
a crankshaft arranged in the crankcase;
connecting rods;
a cross head with arranged piston rod;
a piston compressor housing;
a cylinder;
a piston fastened to the piston rod, the piston being dry-running guided in the cylinder;
valves;
a piston rod sealing device arranged around the piston rod between the cylinder and the crankcase, the piston rod sealing device comprising:
a gland housing, which is inserted into the piston compressor housing; and
a gland device arranged in the gland housing, the gland device comprising: a gland; and a gland jacket into which the gland is pushed;
a movable intermediate ring;
a tilting elements housing arranged in a recess of the gland housing;
a gland flange rigidly connected to the gland housing and to the piston compressor housing;
a fixed ring arranged in a recess of the gland flange;
a plurality of spherically acting tilting elements, which are arranged around a vertical axis of the piston rod between the movable intermediate ring and the fixed ring; and
a tilting ring arranged in a recess of the intermediate ring,
wherein the gland defines with the piston rod a sealing gap, which is open over a common longitudinal section and has a width in a μm range, and which is configured to allow a leakage flow of compressed medium through the sealing gap,
wherein the gland and the gland jacket are each comprised of different materials providing a resulting coefficient of thermal expansion based on the coefficient of thermal expansion of the gland and the coefficient of thermal expansion of the gland jacket and the resulting coefficient of thermal expansion is matched to the coefficient of thermal expansion of a material of the piston rod,
wherein the gland device is connected flush and tightly sealed to the movable intermediate ring, which movable intermediate ring is arranged in a recess of the gland housing between the gland device and the tilting pin housing that is arranged in the recess of the gland housing,
wherein the gland device is in connection via the intermediate ring and the tilting pin housing with the fixed ring that is arranged in a recess of the gland flange,
wherein the gland device is supported without lateral forces on the gland flange with the plurality of spherical elements,
wherein the gland device allows an adjustment of an oblique position of the piston rod with a reduced force action of the piston rod on the gland device via the tilting ring.

12. A piston compressor in accordance with claim 11, wherein the plurality of spherically acting tilting elements comprise a plurality of tilting pins arranged around a vertical axis of the piston rod between the movable intermediate ring and the fixed ring in a planetary configuration, wherein the gland device is supported without lateral forces on the gland flange with the plurality of tilting pins.

13. A piston compressor in accordance with claim 12, wherein the tilting pins have a length of a predefined sphere diameter and have embossed ends with a radius corresponding to half the length of a tilting pin.

14. A piston compressor in accordance with claim 12, wherein the tilting pins are jacketed with an elastomer and elastically positioned in an area facing away from an applied force.

15. A piston compressor in accordance with claim 11, further comprising a sealing ring, wherein the gland device is connected to the intermediate ring flush and sealed tightly via the sealing ring, which sealing ring is arranged in a groove in an end face of the tilting pin housing.

16. A piston compressor in accordance with claim 15, wherein the intermediate ring is hardened and polished and is configured to be moved laterally with the gland device without a lateral force.

17. A piston compressor in accordance with claim 16, wherein the intermediate ring is configured to allow an axial force, applied to the gland device, to be transmitted to the tilting pins, which tilting pins are arranged movably with a spherical movement action of the plurality of spherically acting tilting elements between the intermediate ring and the fixed ring.

18. A piston compressor in accordance with claim 11, wherein the tilting ring has tilting ring end faces with a radius of curvature, which has barrel vaults which are each vaulted in a barrel shape, wherein the axes of the barrel vaults are offset in relation to one another on both end faces of the tilting ring by 90°.

19. A piston compressor in accordance with claim 17, wherein the tilting ring is configured to allow the gland device to adjust an oblique position of the piston rod by a lateral motion of the piston rod without an appreciable force action between the gland device and the piston rod.

20. A piston compressor in accordance with claim 17, wherein the tilting ring allows an amount of pitching movements of the gland device in all directions.

\* \* \* \* \*